P. B. DELANY.
SOUND BOX DIAPHRAGM.
APPLICATION FILED OCT. 20, 1919.

1,401,143.

Patented Dec. 27, 1921.
3 SHEETS—SHEET 1.

INVENTOR
Patrick B. Delany
BY
Abel L. Brownrigg
ATTORNEY

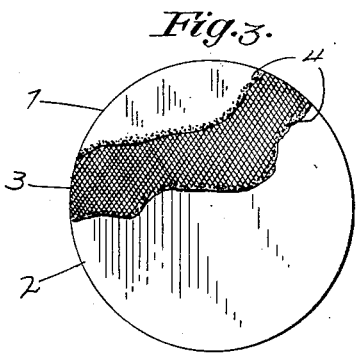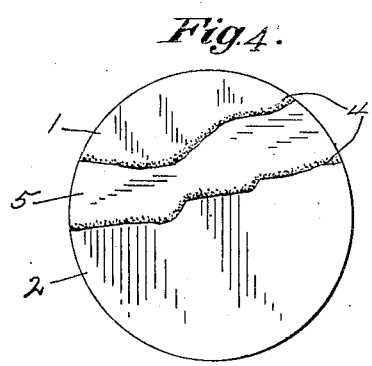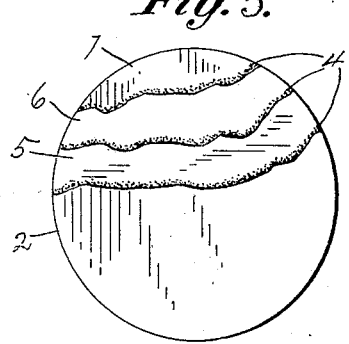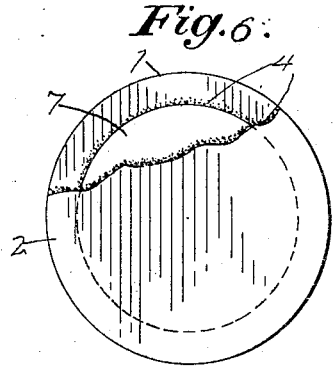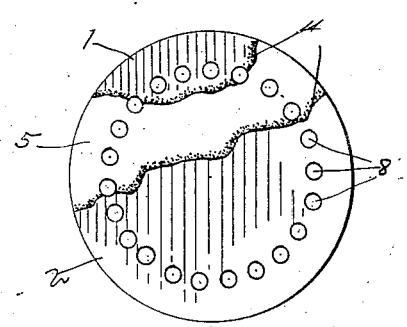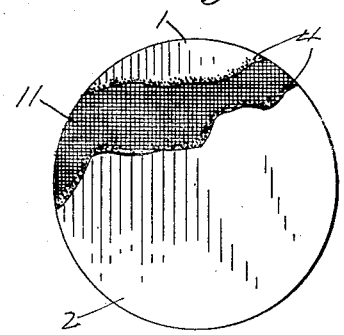

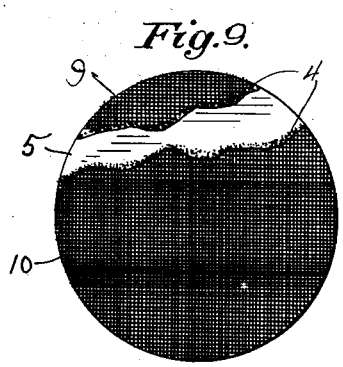
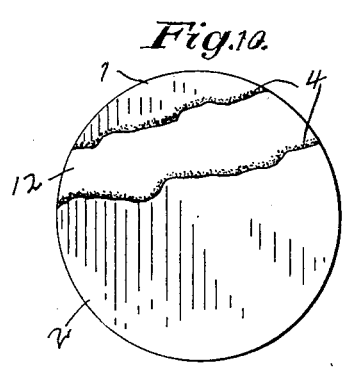
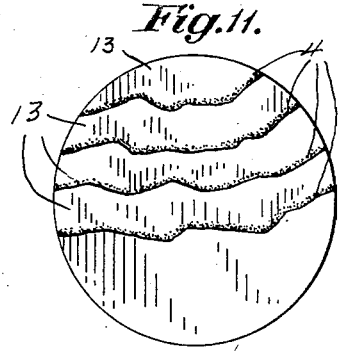
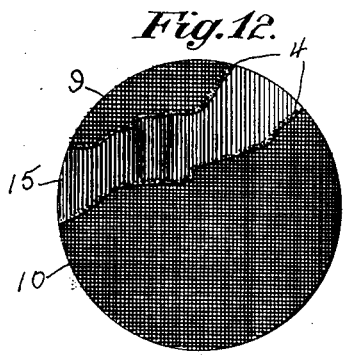
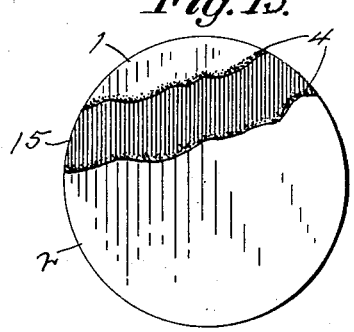
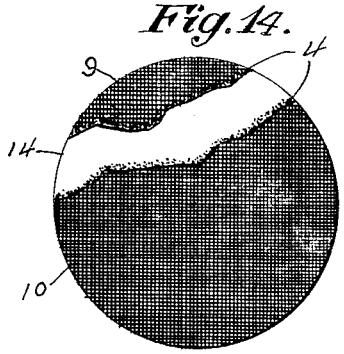

UNITED STATES PATENT OFFICE.

PATRICK B. DELANY, OF SOUTH ORANGE, NEW JERSEY.

SOUND-BOX DIAPHRAGM.

1,401,143. Specification of Letters Patent. Patented Dec. 27, 1921.

Application filed October 20, 1919. Serial No. 331,974.

*To all whom it may concern:*

Be it known that I, PATRICK B. DELANY, a citizen of the United States, residing at South Orange, in the county of Essex and State of New Jersey, have invented a new and useful Sound-Box Diaphragm, of which the following is a specification.

This invention relates to sound box diaphragms such as are used in sound reproducing instruments of the talking machine type.

It is well known that with sound box diaphragms such as are ordinarily used and which are formed of mica, metal or other crystalline substances, it is impossible to reproduce the recorded sounds in their original purity and unaccompanied by extraneous noises due in part to the inherent resonance possessed by materials of this character, and in part to the highly resilient character of such materials by reason of which there was an invariable tendency on the part of the diaphragm to react against the movements thereof produced by the record groove and to thereby interfere with the proper rendition of the recorded sounds.

The principal object of my invention is to provide a diaphragm that will be free from the referred to objectionable features that are characteristic of sound-box diaphragms heretofore known and used; that is possessed of no resonant qualities peculiar to itself; that has little or no inherent resiliency; and that, in addition, is non-rigid, with a resultant unresponsiveness to vibrations tending to transmit undesirable impulses to the sound box in directions parallel to the plane of the diaphragm, and which is responsive only to the desired and useful vibrations that are transmitted perpendicularly to the plane of the diaphragm from the vibrating arm in response to the undulations of the record groove.

In the construction of my improved diaphragm I have discovered that sheets of non-crystalline materials of vegetable or other origin, such as paper, celluloid, silk fabric, rubber, and even thin sheets of certain metals, as aluminum or tin foil, are well adapted for the purpose, and I have found, in the course of experiments conducted for the purpose of the invention, that the best results are obtained when the diaphragms are of the laminated type. In making up the diaphragms I may form the laminations of sheets of the same or unlike materials chosen from the list referred to and attach adjacent sheets together through the medium of layers or sheets of an adhesive compound having as a characteristic the maintenance of a pliable semi-solid consistency at ordinary temperatures and which can be reduced to a proper plastic condition for application to the layers of material through the action of heat. In this manner diaphragms can be built up to any desired thickness, depending on the number of sheets bound together by the compound while in a plastic state. Before the compound has had time to cool the mass of layers of fibrous or other sheets alternating with the plastic is subjected to pressure sufficient to cause a thorough impermeation of the interstices of the fibrous material with the compound. The mass is then allowed to cool and the compound to assume its normal semi-solid state in which condition the completed diaphragm remains permanently pliable but held sufficiently rigid by the gaskets in which it is clamped for maintenance of a neutral mid-position when the vibrating arm is unbiased by the record undulations. As a result of this non-rigid construction the diaphragm while highly susceptible to the weakest transverse vibrations of the vibrating arm, is practically unaffected by the scraping surface vibrations transmitted in planes parallel with the plane of the diaphragm, such vibrations being the most common cause of the disagreeable scratching sounds invariably accompanying the playing of a record on reproducers using diaphragms normally rigid or artificially stiffened by impregnation with silicates or other crystalline materials, or materials that become hard and dry at ordinary temperatures.

In the drawings, in which I have illustrated a number of preferred embodiments of the invention, Figure 1 is the partly broken away view of a diaphragm formed of two disks of stiff paper joined together by means of a permanently pliant plastic compound.

Fig. 3 is a partly broken away view of a diaphragm made up of laminations of paper and wire cloth.

Fig. 4 is a view similar to Fig. 3 showing a diaphragm formed of sheets of paper and celluloid.

Fig. 5 is a view similar to Fig. 3 showing a diaphragm formed of sheets of paper, tin foil and celluloid.

Fig. 6 is a view similar to Fig. 3 and showing a diaphragm formed of sheets of paper with a core of celluloid having a reduced diameter.

Fig. 7 is a view similar to Fig. 3 and showing a diaphragm formed of celluloid and paper with a circular row of perforations formed therein.

Fig. 8 is a view similar to Fig. 3 and showing a diaphragm formed of paper and silk fabric.

Fig. 9 is a view similar to Fig. 3 and showing a diaphragm formed of sheets of silk, celluloid and silk.

Fig. 10 is a view similar to Fig. 3 and showing a diaphragm formed of paper with a core of thin sheet aluminum having a reduced diameter.

Fig. 11 is a view similar to Fig. 3 and showing a diaphragm formed of several sheets of paper.

Fig. 12 is a view similar to Fig. 3 and showing a diaphragm formed of alternate layers of silk and sheet rubber.

Fig. 13 is a view similar to Fig. 3 and showing a diaphragm formed of alternate sheets of paper and rubber.

Fig. 14 is a view similar to Fig. 3 and showing a diaphragm formed of alternate layers of silk fabric and tin foil.

Figure 1:
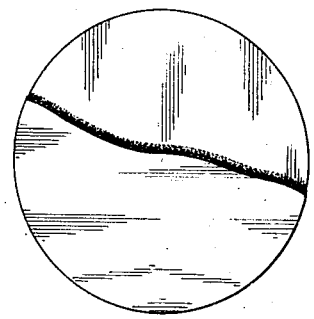

Referring to the drawings, Fig. 1 is a view of a preferred embodiment of the invention which consists of two relatively stiff but approximately thin sheets of paper 1 and 2 with a single layer or sheet of a normally pliant and flexible plastic compound 4 interposed between the sheets of paper. The plastic compound 4 is particularly adapted for this use in that it does not lose its pliancy and flexibility under ordinary temperature conditions. The compound found best suited for the purpose is made up of gutta percha, tar and rosin in proportions that may be varied to correspond to the thickness, or stiffness, or number of paper disks employed and which can be softened to any desired condition of adhesiveness merely by the application of heat. It is obvious that any suitable vegetable gum of similar properties may be substituted for gutta percha in this compound.

I find that the plastic compound described does not dry out and become hard and unyielding under ordinary temperature conditions and is in this important respect greatly superior to substances which have been heretofore employed for the purpose. The list of such substances has included animal glues and gelatins, which quickly become hard and brittle under exposure to the air; silicates, which become hard and crystalline under like conditions; and albumins, varnishes, shellacs, and lacquers which quickly become hard and dry and unfitted for the purpose in view.

Figure 2:
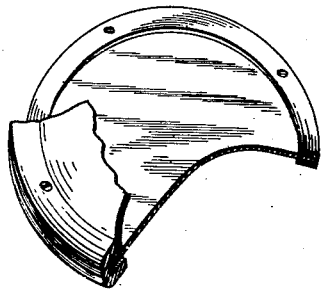
Fig. 2 is a similar view showing a laminated diaphragm formed of fibrous material clamped between rigid gasket members.

The laminated fibrous diaphragm formed of sheets of paper and the permanently flexible plastic compound referred to give excellent results in that the tonal reproduction is without the accompaniment of scratching and metallic noises which associate themselves with diaphragms of heretofore known types. I find that the best results are secured when the laminated fibrous diaphragm described is clamped between hard and unyielding gaskets as at 16 in Fig. 2 of the drawing. The unyielding gaskets when used with the yielding diaphragm gives greatly improved results over the use of hard and unyielding diaphragms with soft rubber gaskets such as have been employed in the prior art. Improved tonal effects are achieved by the use of rigid clamping members with yielding laminated diaphragms in that the vibrations are confined wholly to the body of the diaphragm and forced vibrations are not set up in yielding gaskets which would, in turn, affect the vibrations of the diaphragm. I preferably employ in my construction hard and non-yielding gaskets formed of non-resilient material such as hard rubber, cardboard, wood and the like, and find that greatly improved results are thereby secured over corresponding results obtained by the use of the soft rubber gaskets heretofore employed.

As a result of the absence of any flexibility in the gasket members, the entire dependence for flexibility is placed on the laminated diaphragm itself and consequently the degree of flexibility and the tonal effects desired can be definitely controlled and determined by regulation of the number and thickness of the laminations of which the diaphragm is composed. This cannot be achieved when flexible gaskets are used, since the gaskets obviously yield under the vibrations of the diaphragm, and since the vibration rate of the gaskets is constant and the vibration rate of the diaphragm varies according to the number and thickness of laminations used. It will be seen that with yielding gaskets it would be impossible to obtain a consonant vibration rate between the gaskets and different diaphragms.

In Figs. 4, 5, 6, 7, and 9, I show the use in each case of a layer or layers of celluloid, a substance which I have found well adapted for the purpose. In Fig. 4 a sheet of celluloid 5 forms a core member interposed between the facing members 1 and 2 formed of a thin and tough paper as before. In Fig. 5 is shown a similar structure except that a layer of tin foil 6 is added. In Fig. 6 a similar construction to Fig. 4 is shown except that in this case the core member 7 has a less diameter than that of the paper laminations 1 and 2, so that the core is not clamped between the gaskets of the sound box and is therefore particularly free to move in response to the vibrations of the stylus arm.

In Fig. 7 a similar effect to that obtained in Fig. 6 is secured by providing a circular row of perforations 8 which produce an increased flexibility in the diaphragm along the line of perforations, resulting in a freely movable central area as in Fig. 6. In Fig. 9 I show the use of outer laminations 9 and 10 formed of silk fabric with a core member 5 formed of celluloid as before.

In Fig. 8 there is illustrated a diaphragm formed of paper outside layers 1 and 2 with a core member 11 formed of silk fabric. As in the remaining embodiments the adhesive compound 4 already described is made use of. This form of the invention I find to be an exceedingly effective one and that extremely satisfactory results are obtained by its use.

In Fig. 10 I show a form of the invention in which thin sheet of aluminum 12 is used for a central core member with paper outside layers 1 and 2. Preferably the core member is used with a reduced diameter as in the embodiment shown in Fig. 6.

In Fig. 11 is disclosed a form of the invention in which layers of paper 13, alternating with the adhesive compound 4, constitute the diaphragm. I find this form of the invention to be very useful and that not only does it reproduce without the injection of extraneous metallic sounds, but it is capable of being produced in a wide range of thickness to thereby secure different tonal expressions to correspond with the requirements of different records. The paper used is preferably of a high quality such as the better grades of bond paper, and is chosen for its toughness and uniformity. It will be obvious that variations in the character of the resulting diaphragms may be produced both by varying the number of laminations employed and also by making changes in the thickness of the individual sheets.

In Fig. 12 is disclosed the use of silk fabric 9 and 10 with a core member 13 formed of sheet rubber, while in Fig. 13 is shown a similar construction wherein outside laminations of paper 1 and 2 are substituted for the silk of Fig. 12.

In Fig. 14 is shown a diaphragm formed of silk outside layers 9 and 10 and a core member 14 formed of tin foil. The adhesive 4 is employed as in the remaining embodiments of the invention for attaching the laminations together.

It will be seen that I have worked out a number of embodiments of my invention in which a distinguishing characteristic consists of the employment of laminations of a pliant compound and sheets of fibrous or other non-crystalline material, the laminations being variable in number and thickness to suit the requirements of different instruments. The diaphragms are preferably formed by applying the compound to the fibrous or other disks by first heating the compound to a fluid or plastic state and then subjecting the assemblage to pressure while the compound cools. The characteristic of the compound by which it does not harden beyond a state of relatively great pliancy, assists greatly in producing a diaphragm wholly free from metallic resonance.

In forming the unyielding gaskets I prefer to make use of unfinished hard rubber or other material having a similar surface, so that when clamping pressure is applied to the diaphragm and gaskets, the surface of the diaphragm will be pressed into the rough surface of the gaskets which will prevent any slipping and secure a stable mounting for an indefinite period. In addition, it is well known that soft rubber gaskets deteriorate rapidly and lose their grip on the diaphragm, thus spoiling the reproduction, while gaskets of the materials referred to undergo no change, thereby insuring uniform reproduction permanently.

While I have referred to my improved diaphragm as being of a non-resilient nature, it is to be understood that this term is used in a relative sense and that there is sufficient elasticity in the diaphragm to cause it to respond to the vibrating arm in its every movement, so that the reproduction secured is exceedingly true and free from any secondary or extraneous effects.

What I claim is:

1. A diaphragm for sound boxes comprising two sheets of paper joined together by a layer of compound consisting of gutta percha, tar and rosin.

2. A diaphragm for sound boxes comprising two stiff sheets of paper joined together by a layer of compound containing gutta percha.

3. A diaphragm for sound boxes comprising a plurality of sheets of fibrous material joined together by a layer of compound consisting of gutta percha, tar and rosin.

4. A diaphragm for sound boxes comprising a plurality of sheets of fibrous material joined together by a layer of compound containing gutta percha.

5. A diaphragm for sound boxes comprising a plurality of fibrous disks alternating with films of a gutta percha compound soluble and adhesive under artificial heat and permanently pliable under ordinary temperature conditions.

6. A diaphragm for sound boxes comprising sheets of fibrous material joined together by a plastic compound containing a suitable vegetable gum which becomes adhesive under the action of heat and is normally flexible.

Signed at Nantucket, in the county of Nantucket and State of Mass., this 3rd day of Oct., 1919.

PATRICK B. DELANY.